(12) United States Patent
Straatman et al.

(10) Patent No.: US 8,528,876 B2
(45) Date of Patent: Sep. 10, 2013

(54) SECONDARY BLEED VALVE FOR DUAL FLUSH VALVE

(75) Inventors: Anthony G. Straatman, Thorndale (CA); Bryan Todd Fisher, Appin (CA); Kamran Siddiqul, London (CA); Frank A. Stauder, London (CA)

(73) Assignee: Masco Canada Limited, London, Ontario (CA)

( * ) Notice: Subject to any disclaimer, the term of this patent is extended or adjusted under 35 U.S.C. 154(b) by 585 days.

(21) Appl. No.: 12/771,267

(22) Filed: Apr. 30, 2010

(65) Prior Publication Data
US 2011/0265879 A1 Nov. 3, 2011

(51) Int. Cl.
*F16K 31/12* (2006.01)
*E03D 1/14* (2006.01)

(52) U.S. Cl.
USPC .................................................. 251/26; 4/324

(58) Field of Classification Search
USPC ........... 251/25–26, 45–46, 41, 48, 52, 32–34; 4/303, 324–327
See application file for complete search history.

(56) References Cited

U.S. PATENT DOCUMENTS

| | | | |
|---|---|---|---|
| 1,614,468 A * | 1/1927 | Haas | 251/18 |
| 1,672,366 A * | 6/1928 | Cadwell et al. | 251/23 |
| 2,738,946 A * | 3/1956 | Filliung | 251/35 |
| 2,916,251 A * | 12/1959 | Butts | 251/40 |
| 3,003,741 A * | 10/1961 | McLanahan | 251/26 |
| 3,406,940 A * | 10/1968 | Kertell | 251/40 |
| 3,741,518 A * | 6/1973 | Engstrom | 251/44 |
| 3,806,962 A * | 4/1974 | Sievers | 137/636.1 |
| 4,134,570 A * | 1/1979 | Walker | 251/40 |
| 4,971,287 A * | 11/1990 | Shaw | 251/30.05 |
| 6,299,127 B1 * | 10/2001 | Wilson | 251/38 |
| 2007/0210271 A1 * | 9/2007 | Wilson | 251/40 |

* cited by examiner

*Primary Examiner* — John K Fristoe, Jr.
*Assistant Examiner* — David Colon Morales
(74) *Attorney, Agent, or Firm* — Carlson, Gaskey & Olds, PC (57) ABSTRACT

An apparatus for providing flushing fluid at different rates has a valve for controlling flow through a housing, the valve having a reset area to close the valve, a first bleed valve for constantly providing high pressure fluid to the reset area through a first path, a second bleed valve for providing high pressure fluid to the reset area through a second path, and an actuator. The actuator has a first position in which fluid is prevented from escaping from the second path, a second position in which fluid is allowed to escape from the second path and the second bleed valve is activated, and a third position in which fluid is allowed to escape from the second path and the second bleed valve is deactivated. If the second bleed valve is activated, the first bleed valve causes the reset area to close the valve in a first time period and if the second bleed valve is not activated the first and second valves cause the reset area to close the valve in a second time period wherein the second time period is less than the first time period.

25 Claims, 6 Drawing Sheets

SECONDARY BLEED VALVE FOR DUAL FLUSH VALVE

BACKGROUND OF THE INVENTION

Flush valves may have a handle that, when manipulated, pushes an actuator which, in turn, opens a bypass valve within a piston in the flush valve. By opening the bypass valve, pressure above the piston drops and allows line pressure to lift the piston from its seat within the flush valve and channel water to flush a toilet, urinal or the like. While the toilet or urinal fixture is being flushed, line pressure is also directed above the piston increasing the pressure in this area. As pressure equalizes above and below the piston, the piston seats itself within the flush valve and stops flow therethrough.

As water shortages are experienced and anticipated, water conservation efforts are being pushed by local governments and concerned citizens. Many toilets have dual flush mechanisms that provide greater amounts of water if greater amounts of flow are required. Some control the amount of water electronically with solenoid valves, others use timers and the like to measure the amount of flow through a valve. Some use two levers to control amounts of flows, other use motion detectors and sense the amount of time a fixture is used to control flow.

SUMMARY OF THE INVENTION

According to an exemplar shown and described herein, an apparatus for providing flushing fluid at different rates has a valve for controlling flow through a housing, the valve having a reset area to close the valve, a first bleed valve for constantly providing high pressure fluid to the reset area through a first path, a second bleed valve for providing high pressure fluid to the reset area through a second path, and an actuator. The actuator has a first position in which fluid is prevented from escaping from the second path, a second position in which fluid is allowed to escape from the second path and the second bleed valve is not activated, and a third position in which fluid is allowed to escape from the second path and the second bleed valve is activated. If the second bleed valve is activated, the first bleed valve causes the reset area to close the valve in a first time period and if the second bleed valve is not activated, the first and second valves cause the reset area to close the valve in a second time period wherein the second time period is less than the first time period.

According to another exemplar, a method for providing flushing fluid at different rates includes controlling flow through a housing by using a valve having a reset area to close the valve, providing high pressure fluid to the reset area through a first path, providing high pressure fluid through a bleed valve to the reset area through a second path, maintaining the valve in a static position if an actuator is in a first position in which fluid is prevented from escaping from the second path, opening the valve by placing the actuator in a second position in which fluid is allowed to escape from the second path and the bleed valve is not activated, or opening the valve by placing the actuator in a third position in which fluid is allowed to escape from the second path and the bleed valve is activated. If the bleed valve is activated, the high pressure fluid passing through the first path causes the reset area to close the valve in a first time period and if the bleed valve is not activated, the first and second paths cause the reset area to close the valve in a second time period wherein the second time period is less than the first time period.

According to a still further exemplar, a bleed valve includes housing having a slot and an inlet, a first outlet and a second outlet, a first ball having a dimension to seal either of the first outlet or the second outlet, a second ball having a dimension to seal the second outlet.

These and other features of the present invention can be best understood from the following specification and drawings, the following of which is a brief description.

DETAILED DESCRIPTION OF THE PREFERRED EMBODIMENT

Figure 1:
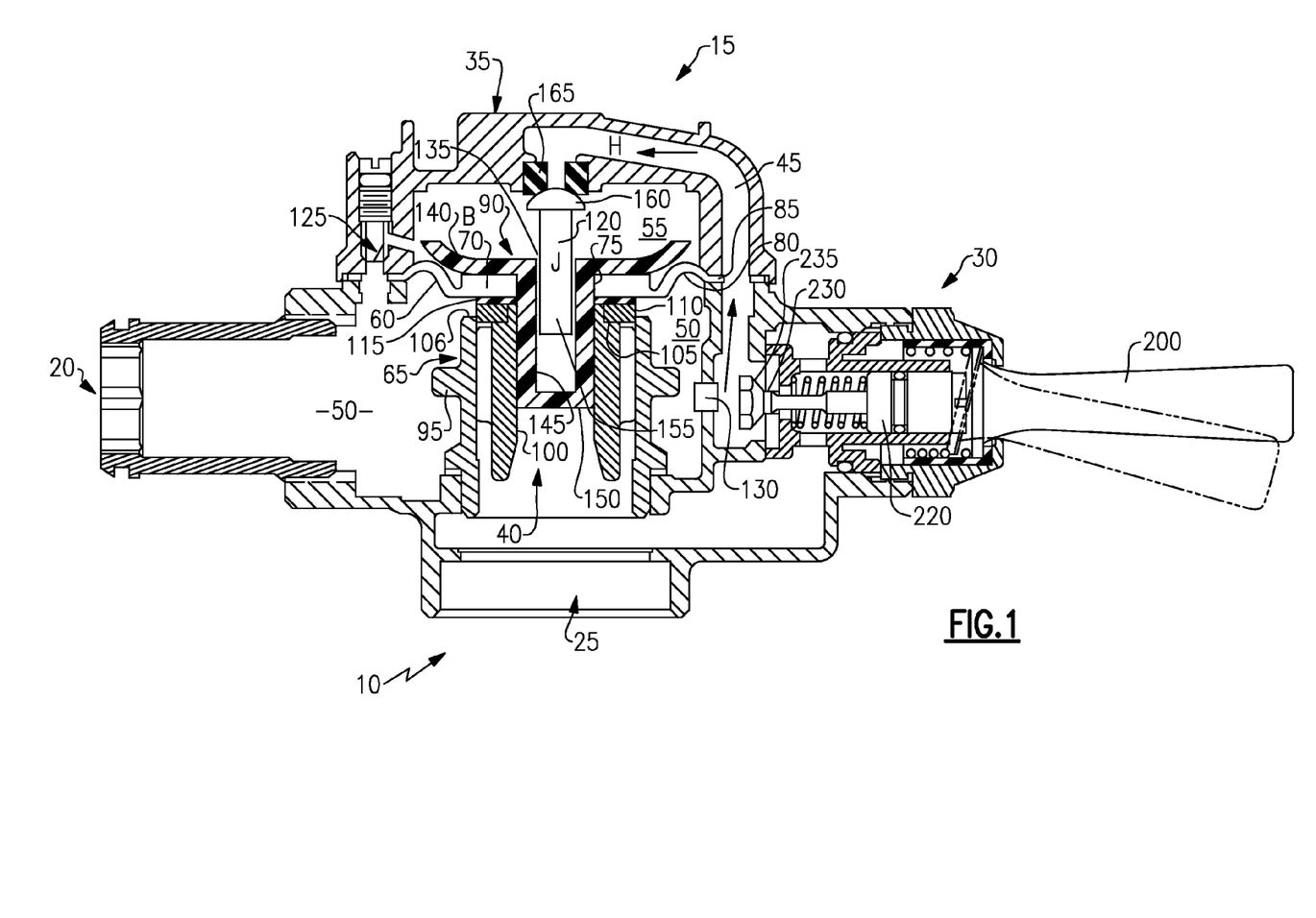
FIG. 1 shows a perspective, sectional view of an embodiment of a flush valve.

Referring to FIG. 1, the embodiment of a water valve 10 for a commercial toilet (not shown) or the like is shown. This embodiment is demonstrative only and may be used to flush other types of toilet(s). The water valve 10 has a housing 15 having an inlet 20, an outlet 25, an activator section 30, a central section 35 holding a valve 40 and a bleed path 45 as will be discussed herein. The valve 40 splits the central section 35 into a high pressure area 50 and a reset area 55 that varies in pressure to actuate the valve 40 to meter water through the valve 40 from the inlet 20 to the outlet 25 as will be discussed herein.

The valve 40 includes a diaphragm 60, a valve assembly 65, a pressure cup 90, a poppet 120 a first bleed valve 125, and a second bleed valve 130. The diaphragm 60 is annular and has a relatively inflexible washer-like body 70 having a central opening 75, a flexible portion 80 extending radially from the body and a clamped portion 85 that is attached to the housing 15 as is known in the art.

The valve assembly 65 includes: an outer housing 95; an inner housing 100 translating axially within the outer housing 95, the inner housing 100 having a ledge 105; a porous washer 110 that allows flow therethrough disposed on the ledge 105 and extending outwardly from the ledge 105 to engage the outer housing 95; and a washer 115 disposed atop the porous washer 110. The housing 100 has an upper surface 106. The washer 115 abuts the body 70 of the diaphragm 60. The pressure cup 90 has a central opening 135, a saucer-shaped body 140 extending radially outwardly from the central opening 135 and a cylindrical body 145 extending downwardly from said body and having an end cap 150. The poppet 120, which has a cylindrical rod 155 and a rounded cap 160 fits loosely within the cylindrical body 145 to control fluid flow from the reset area 55 through the passageway 45 if the rounded cap seats on the seal surface 165 as will be discussed herein. The washer-like body 70 abuts the upper surface 106 of the housing as the reset area 55 fills to create a seal so that water does not flow from the high pressure area 50 to the outlet 25. To allow flow, the washer-like body 70 separates from the upper surface 106 of the housing while rising up to allow flow through the porous washer 110 to outlet 25.

Figure 4:
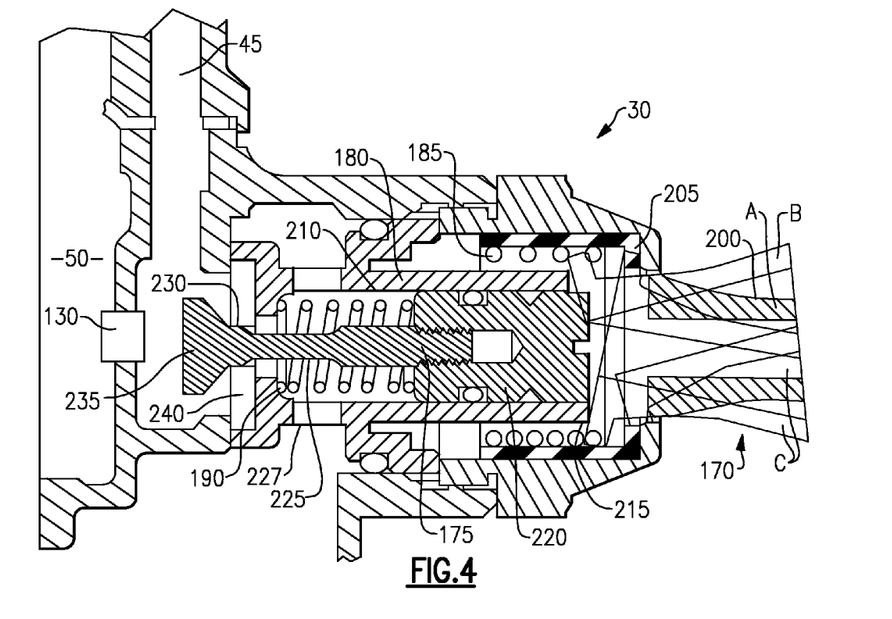
FIG. 4 shows a sectional view of a handle portion of FIG. 1.
Figure 5:
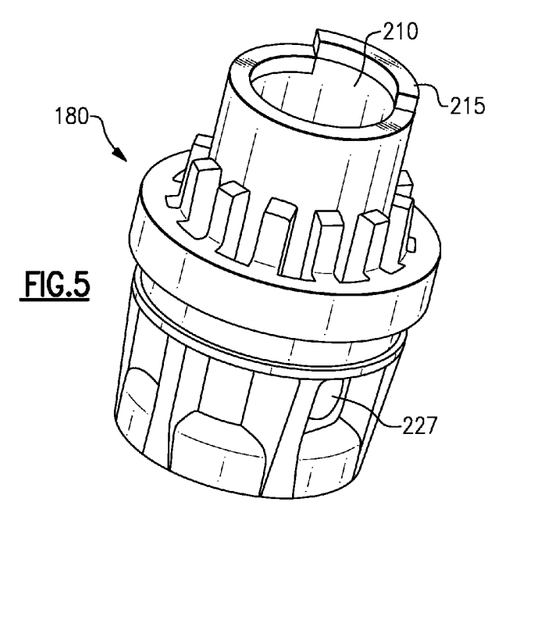
FIG. 5 shows a perspective view of a housing of FIG. 4.

Referring now to FIGS. 4 and 5, the activator section 30 is shown. The activator section 30 includes a handle 170 (shown in three positions A, B and C as will be discussed herein), a plunger 175, a sleeve 180 disposed within the activator housing, a handle reset spring 185, a plunger reset spring 190 and a seal 240 through which the plunger extends.

The handle 170 has an axially extending grip 200 and a radially extending flange 205 disposed in the housing 30 for engaging the plunger 175. Spring 185 urges the handle 170 into position A after usage in position B or C. A user may choose to push the handle 170 into position B to effectuate a longer flush and into position C to effectuate a shorter flush as will be discussed herein.

The sleeve 180 has a central bore 210 (see also FIG. 5) for receiving the plunger 175, a drain hole 227 and has a semicircular portion 215 or contour extending radially towards the handle 170.

The plunger 175 has a cylinder 220 disposed for translation within the bore 210, a narrower neck 225 extending axially from the cylinder 220, a seal portion 230 having a larger diameter than the neck and a conical head 235 extending from the seal portion 230. The seal portion 230 seats within a washer shaped seal 240 that abuts the bleed path 45. If the handle 170 is in either position B or C, flange 205 pushes the plunger 175 axially to the left and moving the seal portion 230 out of contact with the seal 240. When the handle is released, spring 190 starts to move the plunger to the right to move the seal portion 230 into contact with the seal to prevent fluid from flowing therethrough to drain through drain hole 227.

A second bleed valve 130 communicates between inlet 20 of the valve and the bleed passage 45. Referring now to FIGS. 2A-D, 3A and 3B, the second bleed valve includes a left half 245, a right half 250, pin 255, a sealing mechanism such as first upper ball A and second lower ball B. The left half 245 has a circular body 260 having a slot 265 in which stainless steel balls A and B are disposed and an inlet hole 270. The slot 265 is dimensioned such that the stainless steel balls A and B travel within the slot 265 without being able to pass each other therein. The right half 250 is circular having a cylindrical indentation 275 for receiving the left half, a first bleed hole 280 and a second bleed hole 285, the second bleed hole 285 having a first diameter 290 and a smaller second diameter 295. The second bleed hole 285 receives the pin 255 as will be discussed herein. The second bleed hole 285 abuts a channel 300 through which the pin 255 controls flow as will be discussed herein. The channel 300 opens into the area defined by the first diameter 290 of the second bleed hole 285. The left and right halves 245, 250 are made of any suitable material, however, as shown herein, the left and right halves are made of brass.

Figure 3A:
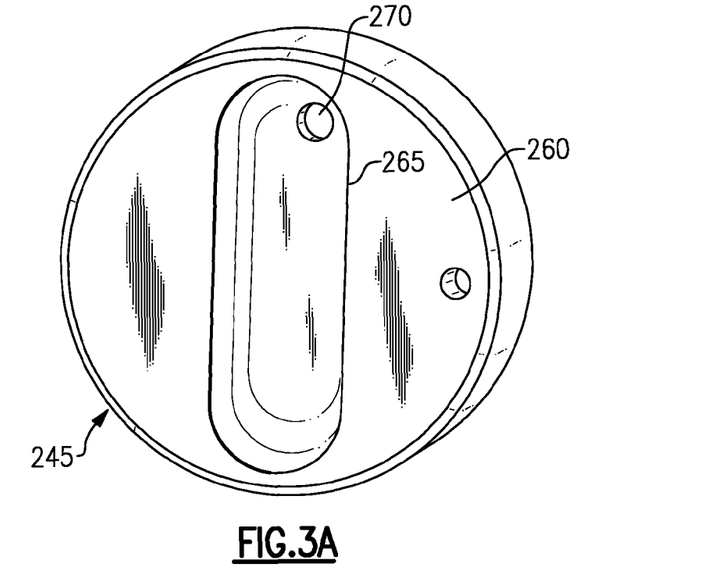
FIGS. 3A and 3B show a housing of FIGS. 2A-D.
Figure 3B:
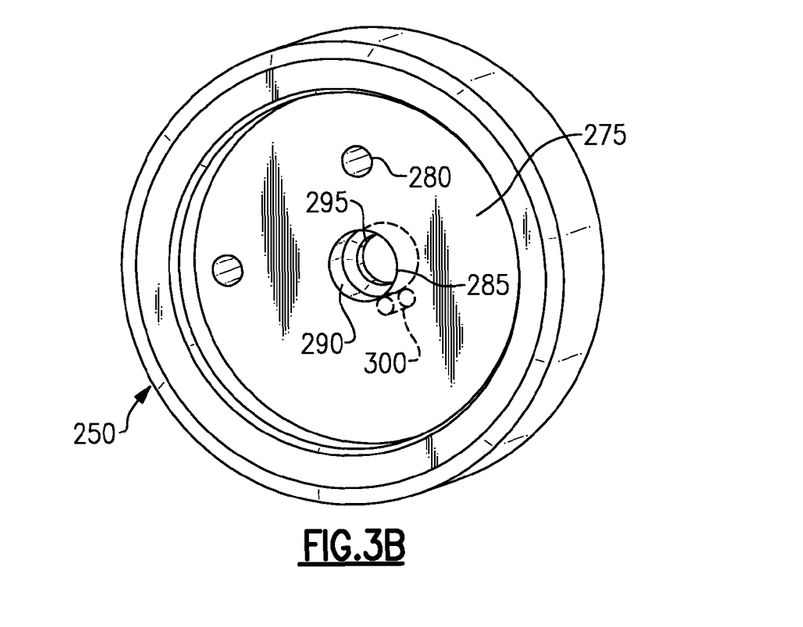

The pin 255 has a shaft 305 extending through the second diameter 295 and a head 310 disposed in the first diameter 290. The head 310 has a portion 302 for sealing against the second diameter 295 and if the portion 302 is seated against the second diameter, no flow passes through the second diameter 295 but flow may pass through the channel 300. The pin shaft 305 and head 310 have a cumulative length that is greater than a depth of the slot 265 so that the shaft 305 does not disengage the first diameter 295 if the second bleed valve 130 is not disposed vertically during transportation, for instance.

Figure 2A:
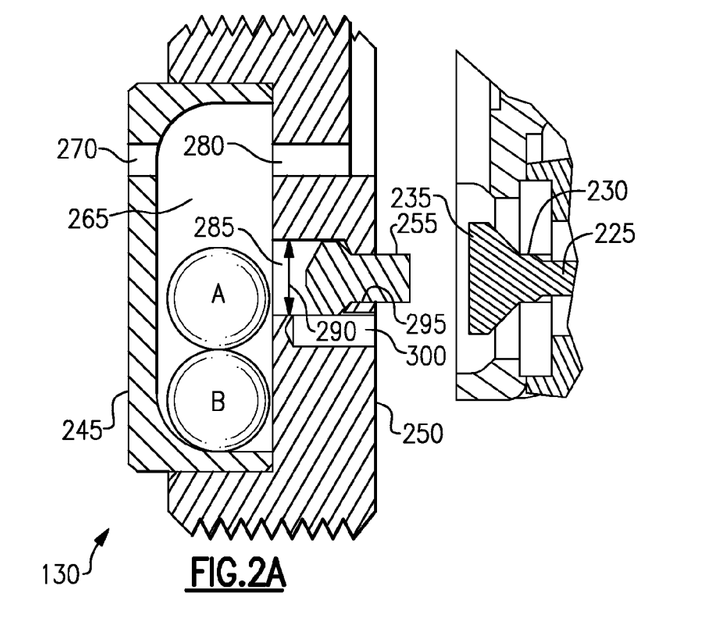
FIGS. 2A, 2B, 2C and 2D each show a sectional view of the flush valve of claim 1 taken along the line 2-2 in which a secondary bleed valve is shown in different operating states.
Figure 2B:
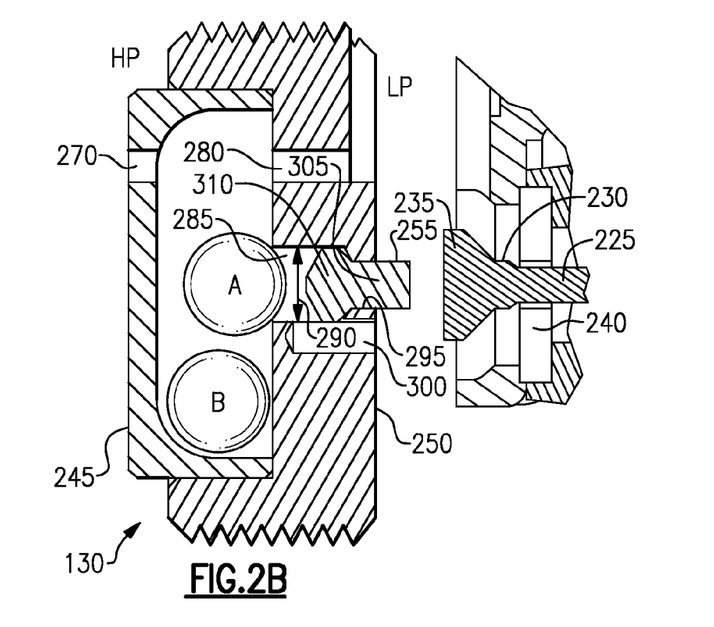
Figure 2C:
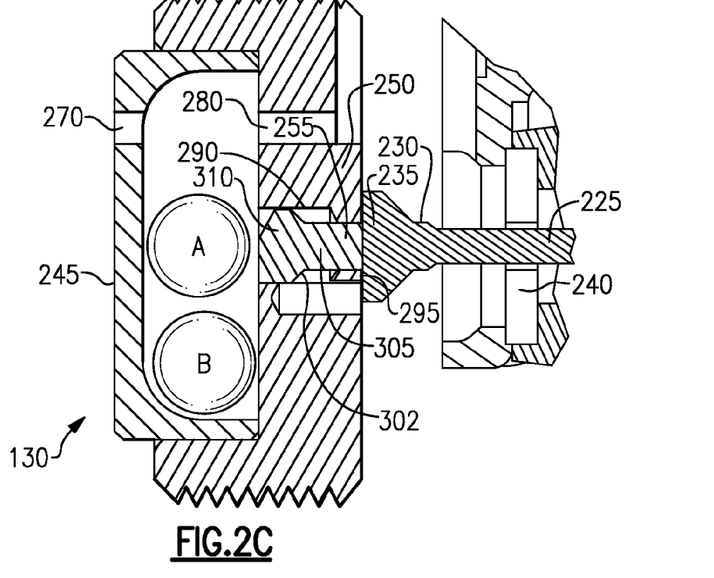
Figure 2D:
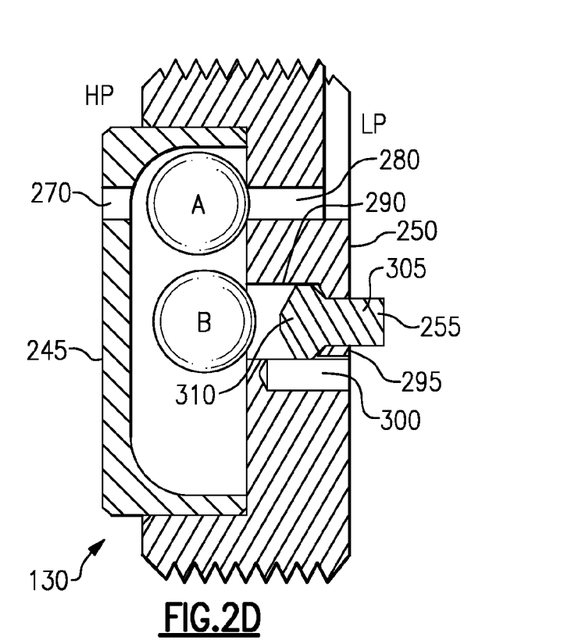

Referring now to FIGS. 1, 2A-2D, and 5, the operation of the second bleed valve 130 is shown. In FIG. 2A, the stainless steel balls are shown at the bottom of the slot 265 in contiguous relationship with ball A touching ball B. In this situation, the valve 40 is static. Pressure in the system is equalized with the pressure in the reset area 55 equal to the pressure in the bleed passage way 45 and the high pressure area 50. As such, no forces are acting on ball A and ball B other than gravity and they sink to the bottom of the slot 265. Moreover, poppet 120 (see FIG. 1) is settled at the bottom of the cylindrical body 145 leaving the bleed passageway open to the reset area 55.

The size and weight of the balls A and B is dependent on the dimensions of the first bleed hole 280, the second bleed hole first diameters 290, the reset area and the channel 300, and the pressure of the water. In this case the balls are about 3.17500 millimeters.

If the handle is driven in the down direction, the stroke of the handle is limited by the semicircular portion 215 on the sleeve 185 within the activator section 30 of the housing 15. The seal portion 230 extends beyond the seal 240 and high pressure water escapes through the gap between the seal portion 230 and the seal 240. The high pressure water drives the diaphragm 60 upwardly voiding the water in the reset area through the bleed passageway 45 until the end cap 150, forced upwardly with the cylindrical body 145 in the housing 100 seals the bleed passageway 45. As the pressure begins to equalize around the plunger head 235, the plunger reset spring 190 urges the plunger cylinder 220 axially towards the handle 170 and the seal portion reengages the seal 240. Because of the short stroke by the plunger caused by interference with the semicircular portion 215, the plunger head 235 does not engage the pin 255 within the second bleed housing 130. The pin 255, therefore stays in sealing relationship within the second diameter 295 in the right side 250 of the second bleed housing 130. However, the flow of high pressure water does flow through the channel 300 and the pressure differential draws ball A upwardly to seal the second hole 290 (see FIG. 2B). Ball B cannot pass Ball A to seal the first hole 280.

Flow then continues through inlet hole 270, and first hole 280 into the bleed passageway 45 to flow towards the reset area 55. Flow also passes into the reset area 55 via first bleed valve 125 and impinges upon the saucer-shaped body 140 that has a greater area than the flexible portion 80 of the diaphragm 60 to push the second housing 100 downwardly to seat the valve 110 in the first housing 95. The first bleed valve 125 is assisted in shutting flow by the flow through the bleed passageway from the second bleed valve 130. The second bleed valve flow then helps fill the reset area 55. Because the first and second bleed valves contribute high pressure flow, flow through the valve is limited to a shorter amount of time—in this instance approximately 4 seconds though other timing is possible.

If the handle is pushed in a direction that does not cause the flange 205 to engage the semicircular portion 215, the plunger moves farther and hits the pin 255, causing the pin to dislodge the ball A and seal off the channel 300. Ball A then migrates to close off first hole 280. Once the handle resets, the water pressure forces the pin axially to the right reopening channel 300 and thereby drawing ball B to seal the second hole 290. At this point only the first bleed valve 125 contributes high pressure water to close the valve 15. The valve then takes longer to close than if the first and second bleed valves 125, 130 contribute to the closing—in this case approximately 6 seconds though other timing is possible.

Figure 6A:
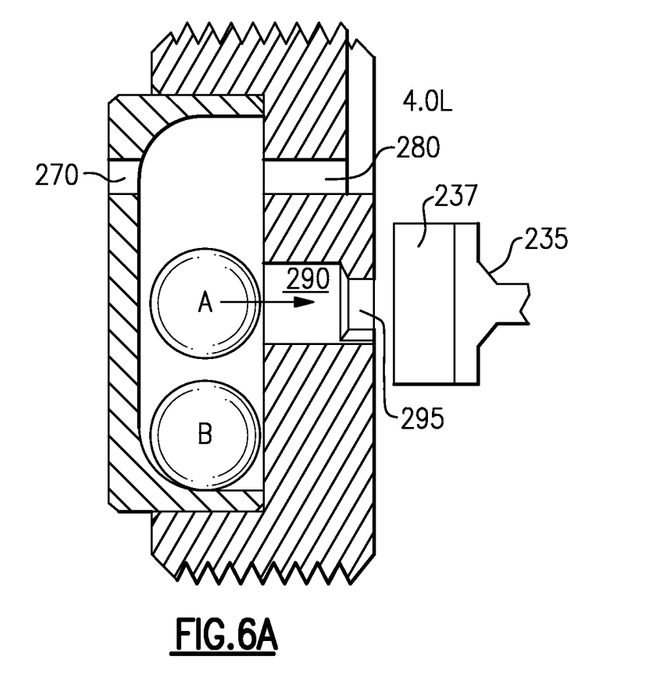
FIGS. 6A and 6B show an alternative embodiment of the secondary bleed valve of FIG. 2.

Referring now to FIGS. 1, 4, 5, 6A and 6B another embodiment is shown. In FIG. 6A, the head 235 is fitted with a seal 237 (shown schematically). There is no pin. If activated for a shorter stroke because flange 205 strikes the semicircular portion 215 of the sleeve 185, extends into the bleed passageway 45 but does not seal the second diameter 295. Water then flows through the first diameter 290 drawing a sealing mechanism such as first ball A into engagement with the first diameter 290 thereby sealing the passageway. As above, flow then continues through inlet hole 270, and first hole 280 into the bleed passageway 45 to flow towards the reset area 55. Flow also passes into the reset area 55 via first bleed valve 125 and impinges upon the saucer-shaped body 140 that has a greater area than the flexible portion 80 of the diaphragm 60 to push the second housing 100 downwardly to seat the valve 110 in the first housing 95. The first bleed valve 125 is assisted in shutting flow by the flow through the bleed passageway from the second bleed valve 130. The pressure on the end cap 150 of the poppet 120 drives the piston downwardly in the cylindrical body 145 because the area of the end cap 150 is greater than the underside of the end cap and the bottom of the poppet 120. The second bleed valve flow then helps fill the reset area 55. Because the first and second bleed valves contribute force to end flow, flow through the valve is limited to a shorter amount of time—in this instance approximately 4 seconds though other timing is possible.

Figure 6B:
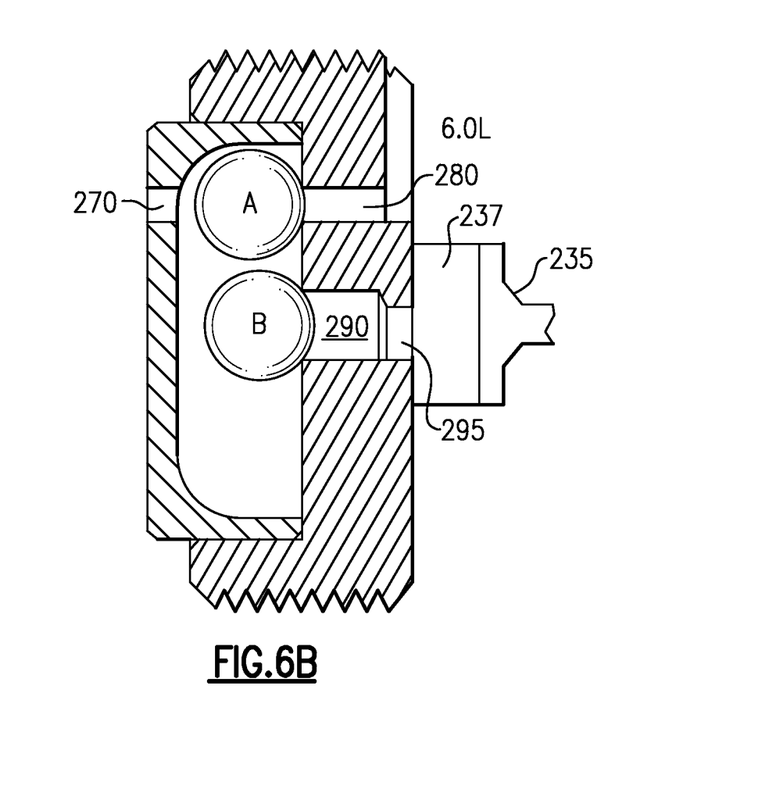

Referring now to FIGS. 5 and 6B, the plunger does not engage the semicircular portion 215 and takes a longer stroke forcing the head 235 into engagement into the area of smaller diameter 295 thereby sealing the hole. Ball A is then drawn to seal hole 280 and, as the plunger is reset and head 235 is withdrawn from the second diameter 295, ball B is drawn to seal the first diameter 290. Then, as above, only first bleed valve 125 contributes high pressure water to close the valve 15. The valve then takes longer to close than if the first and second bleed valves 125, 130 contribute to the closing—in this case approximately 6 seconds though other timing is possible.

Given the ability to flush for different amounts of time, a user may pull the handle 200 in a direction to engage the semicircular portion 215 to achieve that desired amount of time to save water as water flows through both bleed valves 125 and 130. A six second flush, for instance, is not necessary for removing liquid waste and 2 seconds of water flow is saved thereby. However, if removal of solid waste is required, the handle flange 205 does not engage the semicircular portion 215 and, as stated above, only bleed valve 125 allows flow to the reset area 55 to give a longer flush to remove the solid waste.

The semicircular portion 215 of the sleeve 180 may be oriented at any desired position in which a user would be encouraged to use the valve 15 appropriately to save water.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An apparatus for providing flushing fluid at different rates, said apparatus comprising;
   a valve for controlling flow through a housing, said valve having a reset area to close the valve,
   a first bleed valve for constantly providing high pressure fluid to said reset area through a first path,
   a second bleed valve for providing high pressure fluid to said reset area through a second path,
   an actuator having;
      a first position in which fluid is prevented from escaping from said second path,
      a second position in which fluid is allowed to escape from said second path and said second bleed valve is not activated, and
      a third position in which fluid is allowed to escape from said second path and said second bleed valve is activated,
      wherein if said second bleed valve is activated, said first bleed valve causes said reset area to close said valve in a first time period and if said second bleed valve is not activated said first and second valves cause said reset area to close said valve in a second time period wherein said second time period is less than said first time period.

2. The apparatus of claim 1 wherein said second bleed valve comprises;
   a slot having an inlet, a first outlet and a second outlet,
   a first ball having a dimension to seal either of said first outlet or said second outlet,
   a second ball having a dimension to seal said second outlet.

3. The apparatus of claim 2 wherein said slot has a dimension in which said second ball cannot pass said first ball therein.

4. The apparatus of claim 2 further comprising;
   said second outlet having a first area having a first diameter and a second area having a second diameter,
   a pin having a shaft disposed in said first area and a head disposed in said second area, said shaft cooperating with said actuator and,
   a channel in fluid communication with said second area.

5. The apparatus of claim 4 wherein said actuator contacts said pin if said actuator is in said third position.

6. The apparatus of claim 5 wherein said actuator has a plunger.

7. The apparatus of claim 4 wherein said pin has a length such that said pin cannot escape said first area and said second area.

8. The apparatus of claim 1 wherein said valve comprises;
   a pressure cup disposed in said reset area, said pressure cup including a closed body in which a piston translates.

9. The apparatus of claim 8 in which said piston controls flow from said reset area into said second path.

10. The apparatus of claim 1 in which said second path allows fluid to drain from said reset area to open said valve.

11. The apparatus of claim 10 in which said fluid that drains escapes through said actuator.

12. The apparatus of claim 1 wherein said actuator further comprises
   a handle for manipulation,
   a plunger engaging said handle,
   a sleeve having a bore for receiving said plunger and a contour which said handle engages if manipulated, said plunger traveling a first distance if said handle engages said first portion of said contour and a second distance if engaging a second portion of said contour.

13. The apparatus of claim 12 wherein said handle further comprises a flange for engaging said contour and said plunger.

14. A method for providing flushing fluid at different rates, said method comprising;
   controlling flow through a housing by using a valve having a reset area to close the valve,
   providing high pressure fluid to said reset area through a first path,
   providing high pressure fluid through a bleed valve to said reset area through a second path, maintaining said valve in a static position if an actuator is in a first position in which fluid is prevented from escaping from said second path, opening said valve by placing said actuator in a second position in which fluid is allowed to escape from said second path and said bleed valve is not activated, or opening said valve by placing said actuator in a third position in which fluid is allowed to escape from said second path and said bleed valve is activated, wherein if said bleed valve is activated, said high pressure fluid passing through said first path causes said reset area to close said valve in a first time period and if said bleed valve is not activated said first and second paths cause said reset area to close said valve in a second time period wherein said second time period is less than said first time period.

15. The method of claim 14 wherein said method further comprises providing a second bleed valve having a slot having an inlet, a first outlet and a second outlet, providing first sealing mechanism, providing a second sealing mechanism, sealing said first outlet with said first sealing mechanism if said actuator activates said bleed valve wherein said high pressure fluid is provided through said second path to said reset area.

16. The method of claim 14 wherein said method further comprises providing a second bleed valve having a slot having an inlet, a first outlet and a second outlet, providing first ball, providing a second ball, sealing said first outlet with said second ball and sealing said second outlet with said first ball if said actuator activates said bleed valve.

17. The method of claim 16 further comprising;

sealing said first outlet with said second ball.

18. The method of claim 17 further comprising;

providing said first outlet having a first area having a first diameter and a second area having a second diameter, a pin having a shaft disposed in said first area and a head disposed in said second area, said shaft cooperating with said actuator and a channel in fluid communication with said second area and contacting said pin with said actuator to deactivate said bleed valve.

19. The method of claim 14 further comprising controlling flow from said second path into said reset area.

20. The method of claim 14 further comprising draining fluid from said reset area through said second path.

21. The method of claim 20 further comprising draining fluid from said reset area through said actuator.

22. An apparatus for providing flushing fluid at different rates, said apparatus comprising;

a valve for controlling flow through a housing, said valve having a reset area to close the valve;

a first bleed valve that provides high pressure fluid to said reset area through a first path;

a second bleed valve that provides high pressure fluid to said reset area through a second path; and an actuator configured to operate said second bleed valve between a first position in which the valve is static and pressure is equalized across said second bleed valve, a second position in which fluid flows through said second bleed valve and into said second path such that said first and second bleed valves are both supplying high pressure fluid to said reset area, and a third position in which fluid flow is prevented through said second bleed valve such that only said first bleed valve supplies high pressure fluid to said reset area.

23. The apparatus of claim 22 wherein when in said second position said reset area is filled to close said valve in a first time period and when in said third position said reset area is filled to close said valve in a second time period that is greater than said first time period.

24. The apparatus of claim 23 wherein said second bleed valve includes a slot, an inlet hole in fluid communication with said slot, a first bleed hole in fluid communication with said slot, a second bleed hole in fluid communication with said slot and positioned vertically below said first bleed hole, a first ball positioned within said slot, a second ball positioned within said slot vertically below said first ball, wherein said slot has a dimension in which said second ball cannot pass said first ball therein, wherein said first and second balls do not close off either of said first and second bleed holes when said actuator is in said first position, wherein said first ball closes off said second bleed hole when said actuator is in said second position, and wherein said first ball closes off said first bleed hole and said second ball closes off said second bleed hole when said actuator is in said third position.

25. The apparatus of claim 24 wherein said second bleed hole includes a first area defined by a first diameter and a second area defined by a second diameter that is smaller than said first diameter, and including a pin received within said second bleed hole, said pin having a head portion received within said first area and a shaft portion received within said second area, and wherein said actuator is configured to move said pin such that said head portion disengages said first ball from said second bleed hole to allow said second bleed valve to move from said second position to said third position.

* * * * *